United States Patent [19]
Yoshioka

[11] Patent Number: 5,852,998
[45] Date of Patent: Dec. 29, 1998

[54] FUEL-INJECTION CONTROL DEVICE FOR OUTBOARD MOTORS

[75] Inventor: Hidehiko Yoshioka, Shizuoka-ken, Japan

[73] Assignee: Suzuki Motor Corporation, Japan

[21] Appl. No.: 816,656

[22] Filed: Mar. 13, 1997

[30] Foreign Application Priority Data

Mar. 26, 1996 [JP] Japan .................................. 8-069766

[51] Int. Cl.$^6$ ..................................................... F02D 41/06
[52] U.S. Cl. .......................................................... 123/491
[58] Field of Search ............................................. 123/491

[56] References Cited

U.S. PATENT DOCUMENTS

| | | | |
|---|---|---|---|
| 4,469,074 | 9/1984 | Takao et al. ............................ | 123/492 |
| 4,495,920 | 1/1985 | Matsumura et al. .................... | 123/436 |
| 4,723,523 | 2/1988 | Kataoka et al. ......................... | 123/491 |
| 4,936,277 | 6/1990 | Deutsch et al. ......................... | 123/436 |
| 4,960,097 | 10/1990 | Tachibana et al. ..................... | 123/492 |
| 5,074,271 | 12/1991 | Suzuki et al. ........................... | 123/491 |
| 5,394,857 | 3/1995 | Yamakawa .............................. | 123/491 |

*Primary Examiner*—Andrew M. Dolinar
*Attorney, Agent, or Firm*—Morrison Law Firm

[57] ABSTRACT

In an outboard motor having a fuel-injected two-cycle engine, engine speed, throttle setting, engine boost pressure, and/or other variables are detected and a basic fuel injection volume determined. Fuel is supplied to each of the engine's cylinders according to the detected values. When the engine is stopped, information about the operating conditions of the engine before the engine was stopped are saved in a memory of a controller. These saved values represent the residual fuel volume left in the engine's cylinders at a subsequent start-up of the engine. The saved values are used to correct the basic fuel injection volume determined at start-up by the controller.

32 Claims, 7 Drawing Sheets

Fig. 7 (a) Correction map based on engine speed

|  | Engine speed |
|---|---|
| Correction value | A1  A2  A3  A4  A5  A6  . . . |

Fig. 7 (b) Correction map based on throttle setting

|  | Throttle setting |
|---|---|
| Correction value | B1  B2  B3  B4  B5  B6  . . . |

Fig. 7 (c) Correction map based on engine boost pressure

|  | Engine boost pressure |
|---|---|
| Correction value | C1  C2  C3  C4  C5  C6  . . . |

Fig. 7 (d) Correction map based on time elapsed since engine stopped

|  | Time elapsed since engine stopped |
|---|---|
| Correction value | D1  D2  D3  D4  D5  D6  . . . |

Fig. 7 (e) Correction map based on trim angle

|  | Trim angle |
|---|---|
| Correction value | E1  E2  E3  E4  E5  E6  . . . |

FUEL-INJECTION CONTROL DEVICE FOR OUTBOARD MOTORS

BACKGROUND OF THE INVENTION

The present invention relates to fuel-injection control devices for outboard motors. More particularly, the invention relates to fuel-injection control during engine start-up.

Engines can use a carburetor as a means for supplying a fuel-and-air mixture to the cylinder. A carburetor in the suction flow path of an engine takes advantage of the vacuum created when air is sucked in by the engine. The vacuum forces fuel to be drawn from a chamber through a jet to form a mist which mixes with air being drawn into the engine.

To compensate for the specific characteristics of the engine and the load (e.g., automobile) it drives, various different jet types can be used to provide an optimal setting. Previously, it has been impossible to have the carburetor adapt continuously to changes in driving conditions, surrounding environments, and the like. Particularly, the problem of achieving a proper setting for the air-to-fuel ratio when the engine is started is subtle and problematic.

Lately, engines employing fuel-injection have been widely used as an alternative to carburetors. A fuel-injection devices can be controlled according to parameters such as the temperatures of the engine and the water used to cool the engine, the air suction temperature. These data are processed using a computer to determine a correction value. The amount of fuel, injected directly into the suction path of the engine, can be made appropriate for the particular set of circumstances existing at any particular moment. Thus, combustion efficiency can be optimized continuously, maximizing engine output. Also, since only a minimum required quantity of fuel is injected, fuel consumption is minimized.

When an engine is started up, the rate of fuel required varies during the time immediately after the engine is started, as the engine is warming up, to the time after the engine is fully warmed. The fuel injector can make continuous precise adjustments of the amount of injected fuel to as appropriate to each of these phases.

When an engine is stopped, a residual quantity of fuel remains in the engine. This residual fuel can vary depending on the manner in which the engine is stopped. In outboard motor engines the engine may be stopped after a long period of trawling, or it might be stopped immediately after the throttle has been opened all the way. In such cases, different amounts of residual fuel would remain in the engine.

Referring to FIGS. 8(a)–8(e), curves indicate the relationship between the amount of residual fuel and the conditions under which the engine was stopped. Referring to FIG. 8(a), when the engine is operating at a low rotation speed before it is stopped, there is more residual fuel compared to when the engine is operating at a high rotation speed. Referring to FIG. 8(b), similarly, there is more residual fuel when the throttle is not opened very far compared to when the throttle is fully opened.

Referring to FIG. 8(c), a larger quantity of residual fuel remains when the boost pressure of the engine is low before it is stopped than when the boost pressure is high. Referring to FIG. 8(d), the more time that has elapsed after the engine has stopped, the less residual fuel there is. However, the change in the amount of residual fuel is minor once a week has passed since the engine was stopped.

In outboard motors, a shaft of a bracket attaching the motor to the boat can be pivoted (trimmed). Referring to FIG. 8(e), the greater the trim angle, the more residual fuel remains.

Prior art fuel injection control during engine start-up does not take into consideration the issue of residual fuel remaining after the engine is stopped, as described above. Thus, depending on the manner in which the engine was stopped, the time that has elapsed since the engine was stopped, and the like, the normal amount of injected fuel at start-up may result in a fuel concentration that is too high or too low, thus making the air-to-fuel ratio inappropriate. This could result in difficulty in starting the engine, or cause the engine to stop (stall) immediately after it starts.

OBJECTS AND SUMMARY OF THE INVENTION

An object of the present invention is to overcome the problems of the prior art described above and to provide a fuel-injection control device for outboard motors that improves engine start-up.

Briefly, in an outboard motor having a fuel-injection two-cycle engine, engine speed, throttle setting, engine boost pressure, and/or other variables are detected and a basic fuel injection volume determined. Fuel is supplied to each of the engine's cylinders according to the detected values. When the engine is stopped, information about the operating conditions of the engine before the engine was stopped are saved in a memory of a controller. These saved values represent the residual fuel volume left in the engine's cylinders at a subsequent start-up of the engine. The saved values are used to correct the basic fuel injection volume determined at start-up by the controller.

To achieve the objects described above, according to an embodiment of the invention a fuel-injection control device for an outboard motor having a two-cycle fuel-injected engine detects rotation speed, throttle setting, boost pressure, and the like of the engine. Basic fuel injection quantity is determined and injected into each cylinder. When the engine is stopped, the operating conditions of the engine before the engine was stopped are stored. The stored values are used to estimate the amount of residual fuel in the engine after the engine is stopped and the estimated value used to compensate the basic fuel injection quantity.

According to another embodiment of the invention, a fuel-injection control device for an outboard device having a two-cycle fuel-injected engine determines a basic fuel quantity based on the rotation speed, throttle setting, boost pressure, and other parameters detected. Fuel is injected into each cylinder. When the engine is stopped, the trim angle of the engine before the engine was stopped is stored. On the basis of the stored values, an estimate is made of the amount of residual fuel in the engine after the engine is stopped and used to compensate the basic fuel injection amount.

According to another embodiment of the invention a fuel-injection control device for an outboard motor having a two-cycle fuel-injected engine detects rotation speed, throttle setting, boost pressure, and the like of the engine. Basic fuel injection quantity is determined and injected into each cylinder. After the engine is stopped, the time the engine was stopped is recorded and used to calculate the elapsed time when the engine is restarted. The elapsed time is used to estimate the amount of residual fuel in the engine after the engine is stopped and the estimated value used to compensate the basic fuel injection quantity.

The above, and other objects, features and advantages of the present invention will become apparent from the following description read in conjunction with the accompanying drawings, in which like reference numerals designate the same elements.

According to an embodiment of the present invention, there is provided, a fuel injection control device for outboard motors with a fuel-injected engine comprising: a main control unit, one of an engine speed detector, a throttle setting detector, an engine boost pressure detector, a timer, and a trim angle of the outboard motor, the main control unit being programmed to calculate a basic fuel injection volume responsively to the one of an engine speed detector, a throttle setting detector, an engine boost pressure detector, a timer, and a trim angle of the outboard motor, the main control unit being further programmed to calculate a corrected fuel injection volume from the basic fuel injection volume responsively to at least one of a stored past value of the engine speed, a stored past value of the engine boost pressure, a stored past value of the trim angle, and at a time when the engine is started, a time elapsed since the engine was previously stopped, the main control unit being further programmed to control delivery of the corrected fuel injection volume to the fuel injected engine.

According to another embodiment of the present invention, there is provided, a fuel injection control device for outboard motors with a fuel-injected engine, comprising: a control unit with a memory, a detector connected to detect an operating state of the outboard motor at, or prior to, a shutdown of the motor, the control unit being programmed to store in the memory information responsive to the operating state of the outboard motor, the control unit being further programmed to control an initial flow of fuel to the engine, at a time of start up of the engine, responsively to the information stored in the memory.

According to still another embodiment of the present invention, there is provided, a method for controlling fuel flow rate to a fuel injector of an outboard motor having an engine, comprising the steps of: indicating a time of a stopping of the engine, indicating a time of a starting of the engine after the stopping, calculating a datum representing a period of shut-down of the engine responsively to the step of indicating a time of stopping and the step of indicating a time of starting, controlling an initial rate of fuel delivery to the engine, at the time of starting, responsively to the datum.

According to still another embodiment of the present invention, there is provided, a method for controlling fuel flow rate to a fuel injector of an outboard motor having a two-cycle engine, comprising the steps of: measuring at least one of a speed of the engine, a throttle setting of the engine, a boost pressure of the engine, and a trim angle of the outboard motor during a period of operation of the engine, saving, in a memory, a result of the step of measuring at a time immediately before the engine is stopped, controlling an initial rate of fuel delivery to the engine, when the engine is started up again after the engine was stopped, responsively to the result of the step of measuring stored in the memory.

According to still another embodiment of the present invention, there is provided, a fuel injection control device for outboard motors with a fuel-injected engine comprising: a main control unit, one of an engine speed detector, a throttle setting detector, an engine boost pressure detector, a timer, and a trim angle of the outboard motor, the main control unit being programmed to calculate a fuel injection volume from a current operating state of the engine, the main control unit being further programmed to calculate, for injection at a time when the engine is started, a corrected fuel injection volume responsively to at least one of a stored past value of the engine speed, a stored past value of the engine boost pressure, a stored past value of the trim angle, and a time elapsed since the engine was previously stopped.

According to still another embodiment of the present invention, there is provided, a fuel injection control device for outboard motors with a fuel-injected engine comprising: means for controlling a fuel injector, means for detecting one of an engine speed, a throttle setting, an engine boost pressure, and a time interval between a shutdown of the engine and a start-up following the shutdown, and a trim angle of the outboard motor, the means for detecting having means for applying an output signal to the means for controlling, the output signal being responsive to a detecting of the means for detecting, the means for controlling further including means for storing information derived from the output signal, the main control unit further including means for calculating, for injection at a time when the engine is started, a corrected fuel injection volume, the corrected fuel volume being calculated responsively to the information derived from the output signal.

According to still another embodiment of the present invention, there is provided, a control system for a fuel-driven motor, comprising: a fuel delivery system connected to the fuel-driven motor to supply fuel thereto at a variable rate, a controller connected to control the variable rate of the fuel delivery system, a first sensor to sense a current operating condition of the motor, the sensor being connected to apply an output reflecting the current operating condition of the motor to the controller, the controller having a memory connected to the first sensor, the controller being programmed to store a result of a measurement, by the sensor, in the memory when the engine is running and retain the result in the memory after a shutting down of the engine and the controller being further programmed to read the memory and control the variable rate of the fuel delivery system responsively to the result stored in the memory when the engine is started up following the shutting down.

According to still another embodiment of the present invention, there is provided, a method of controlling fuel delivery to an engine motor, comprising the steps of: sensing a current operating condition of the engine while the engine is running, adjusting a rate of fuel delivery to the engine responsively to a result of the step of sensing, storing, in a memory, a result of the step of sensing, retaining the result stored in the memory after the a halting of the engine, retrieving the result stored in the memory at a starting of the engine, the starting occurring after the halting, determining, responsively to the result retrieved from the memory, an initial rate of fuel delivery to the engine to occur during the starting.

BRIEF DESCRIPTION OF THE DRAWINGS

FIG. 7(a)–(e) are diagrams indicating sample correction maps for the saved values obtained from the save routine.

DETAILED DESCRIPTION OF THE PREFERRED EMBODIMENTS

Figure 1:
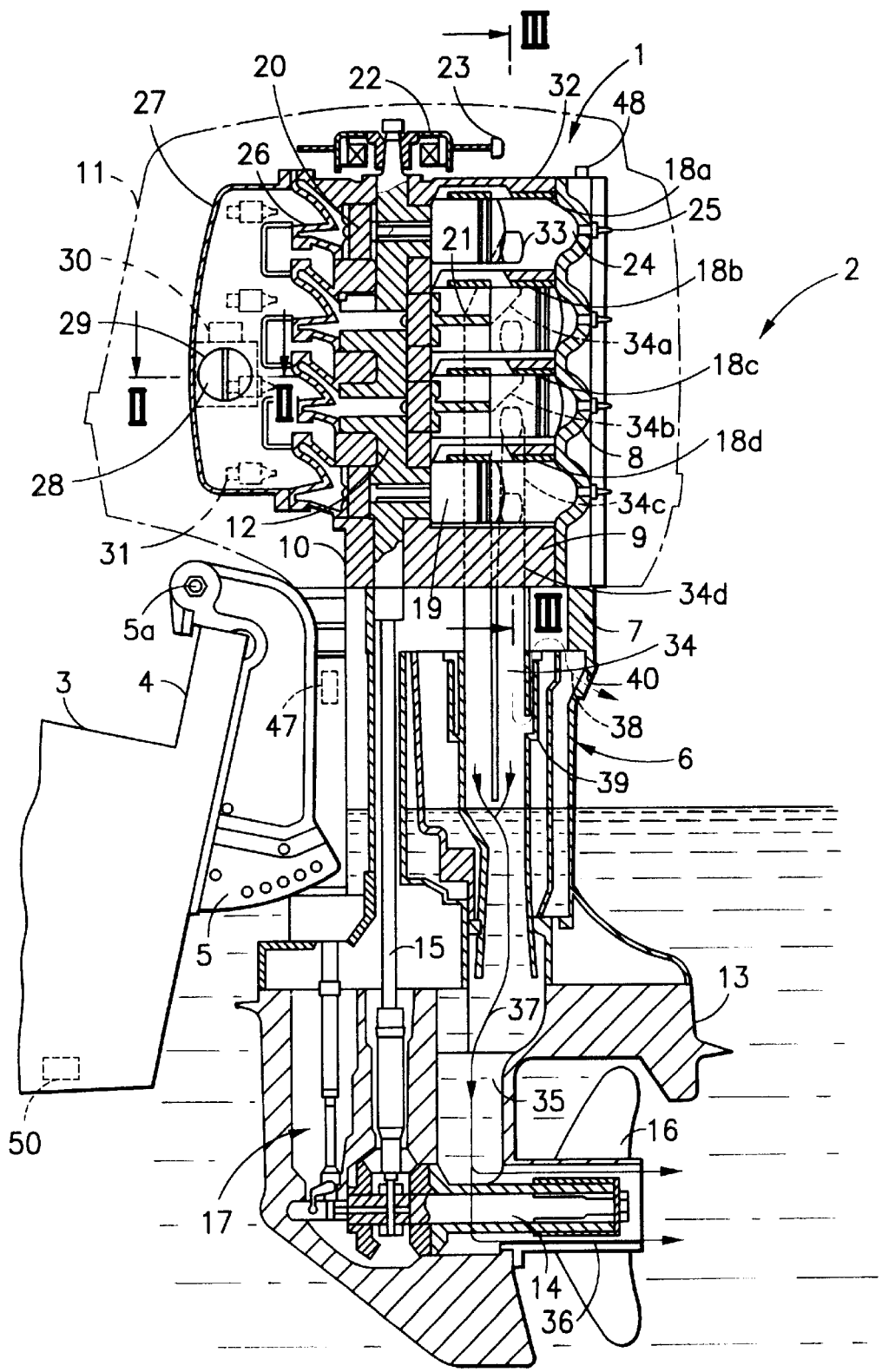
FIG. 1 is a vertical cross-section of an outboard device showing an embodiment of the fuel-injection control device for outboard motors according to the present invention.

Referring to FIG. 1, the present invention is implemented in an example of an outboard motor 2 equipped with a fuel-injected engine 1. Outboard motor 2 is mounted via a bracket 5 on a transom 4 of a boat 3. Outboard motor 2 pivots on a shaft 5a of bracket 5 permitting a trim angle to vary in a range of approximately 20 degrees. Bracket 5 also allows outboard motor 2 to be tilted over a range of about 60 degrees upward beyond the full trim position. The trim angle and the tilt angle are controlled through oil pressure by a power trim and tilt device (hereinafter referred to as PTT—not shown in the drawing). A PTT operations sensor 47 is disposed on the PTT which detects the current trim and tilt conditions.

Outboard motor 2 has a drive shaft housing 6. An engine holder 7 is located on an upper portion of drive shaft housing 6. An engine 1 is located above engine holder 7. Engine 1 includes a cylinder head 8, a cylinder block 9, a crank case 10, and other conventional elements. Engine 1, is covered by an engine cover 11. A vertical crank shaft 12 rotates within crank case 10. Engine 1 could be, for example, a cold-water two-cycle, four-cylinder engine.

Below drive shaft housing 6 a gear case 13 rotatably supports a propeller shaft 14 driven by engine 1. Torque from engine 1 is transmitted through crank shaft 12 to drive shaft 15. Drive shaft 15 in turn rotates propeller shaft 14, causing a propeller 16, on a rear end portion of propeller shaft 14, to rotate. A shift mechanism 17 near a front end portion of propeller shaft 14, allows remote control of the direction of rotation of propeller shaft 14.

A first, second, third, and fourth cylinders 18a–18d are formed in cylinder block 9 of engine 1, arranged with first cylinder 18a at the top and cylinder 18d at the bottom. Pistons 19, slidable in cylinders 18a–18d, are connected to crank pins 20 of crank shafts 12 via connecting rods 21. Thus, reciprocating movements of pistons 19 are converted into a rotating motion of crank shaft 12.

A magnet 22 is disposed on an upper end of crank shaft 12. An engine rotation speed sensor 23 fixedly mounted adjacent magnet 22. Engine rotation speed sensor 23 detects the rotation speed (the crank angle of crank shaft 12) of engine 1 by detecting the rotation of magnet 22. An engine temperature sensor 28 on engine 1 detects engine temperature. A cooling water temperature sensor (not shown in the drawing) detects the temperature of the engine cooling water. A spark plug 25 is held partly in a central portion of combustion chamber 24 by threads. Spark plug 25 is fired by an ignition coil 46 to which it is connected.

Figure 2:
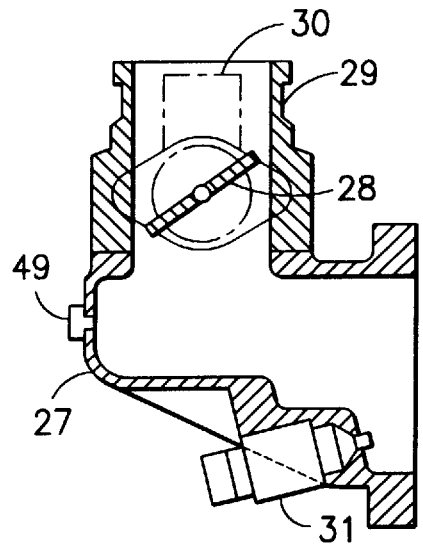
FIG. 2 is a cross-section drawing along the II—II line in FIG. 1.
Figure 3:
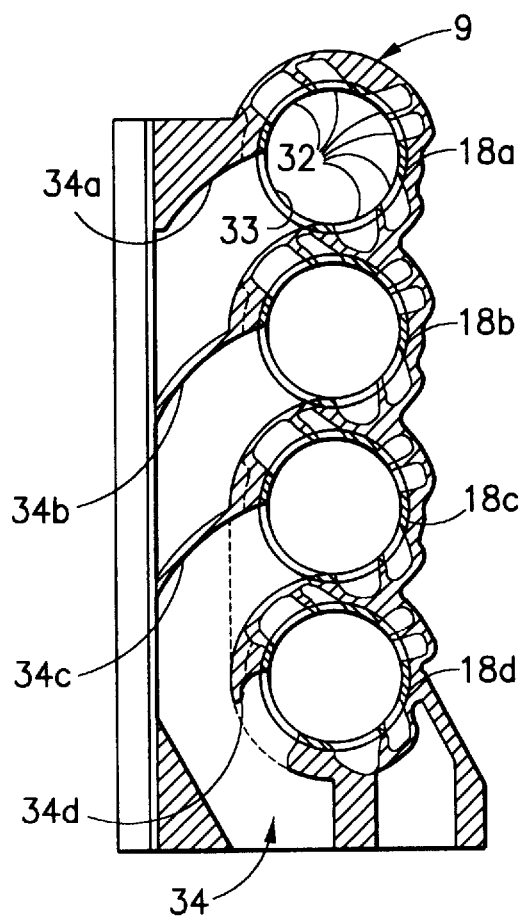
FIG. 3 is a cross-section drawing along the III—III line in FIG. 1.

Referring now also to FIGS. 2 and 3, there is one lead valve device 26, in crank case 10, for each cylinder 18a–18d. Upstream from lead valve devices 26 is a surge tank 27, and further upstream of surge tank 27 is an inlet pipe 29 with a throttle 28. A throttle setting sensor 30 detects a setting of throttle 28 is positioned outside inlet pipe 29. An air cleaner (not shown in the drawings) is located further upstream of inlet pipe 29.

Fuel injectors 31 extend from outside surge tank 27 to its interior. In the present embodiment, there is one fuel injector 31 for each of cylinders 18a–18d. In alternative embodiments, there can be more or less. In the present embodiment, fuel injectors 31 are positioned to inject fuel upstream from lead valves 26. An inlet temperature detector 49 mounted in surge tank 27 detects inlet temperature at a crank chamber 10a located upstream within crank case 10. A suction pressure sensor (not shown in the drawings) detects suction pressure. An air volume sensor, an atmospheric pressure sensor, and other sensors are employed as taught by the prior art.

Lead valve devices 26 are connected downstream of crank chamber 10a. Scavenging ports 32 are formed in cylinder block 9. Scavenging ports 32 open along an inner perimeter surface of each of cylinders 18. An exhaust port 33 is also formed along the inner perimeter surface of cylinder 18. An exhaust path 34 extends from exhaust port 33.

A first exhaust path 34a of first cylinder 18a joins with a second exhaust path 34b from second cylinder 34b and extends to roughly the center of drive shaft housing 6. Similarly, a third exhaust path 34c of third cylinder 18c joins with a fourth exhaust path 34d of fourth cylinder 18d and extends to roughly the center of drive shaft housing 6, where they join with first and second exhaust paths 34a and 34b. The end of a combined exhaust path 34 opens up to an exhaust chamber 35 within gear case 13. Exhaust chamber 35 connects to a final exhaust path 36 formed around propeller shaft 14.

The lower half of drive shaft housing 6 and gear case 13 are submerged under water. When engine 1 is stopped, the lower half of the exhaust path, exhaust chamber 35, and final exhaust path 36 are filled with water. When engine 1 is operated, this water is pressed downward by the exhaust pressure from the exhaust gas. Referring to FIG. 1, exhaust gas is sent to the water as indicated by arrows 37 (shown as solid lines). When the engine is being idled or when the engine is being ran at a slow speed, the exhaust pressure is not high enough to adequately push the water downward. In such cases, the exhaust gas is evacuated to the atmosphere through a secondary exhaust opening 40 via a bypass path 39 formed in drive shaft housing 6, as indicated by arrows 38 (shown as dotted lines).

Figure 4:
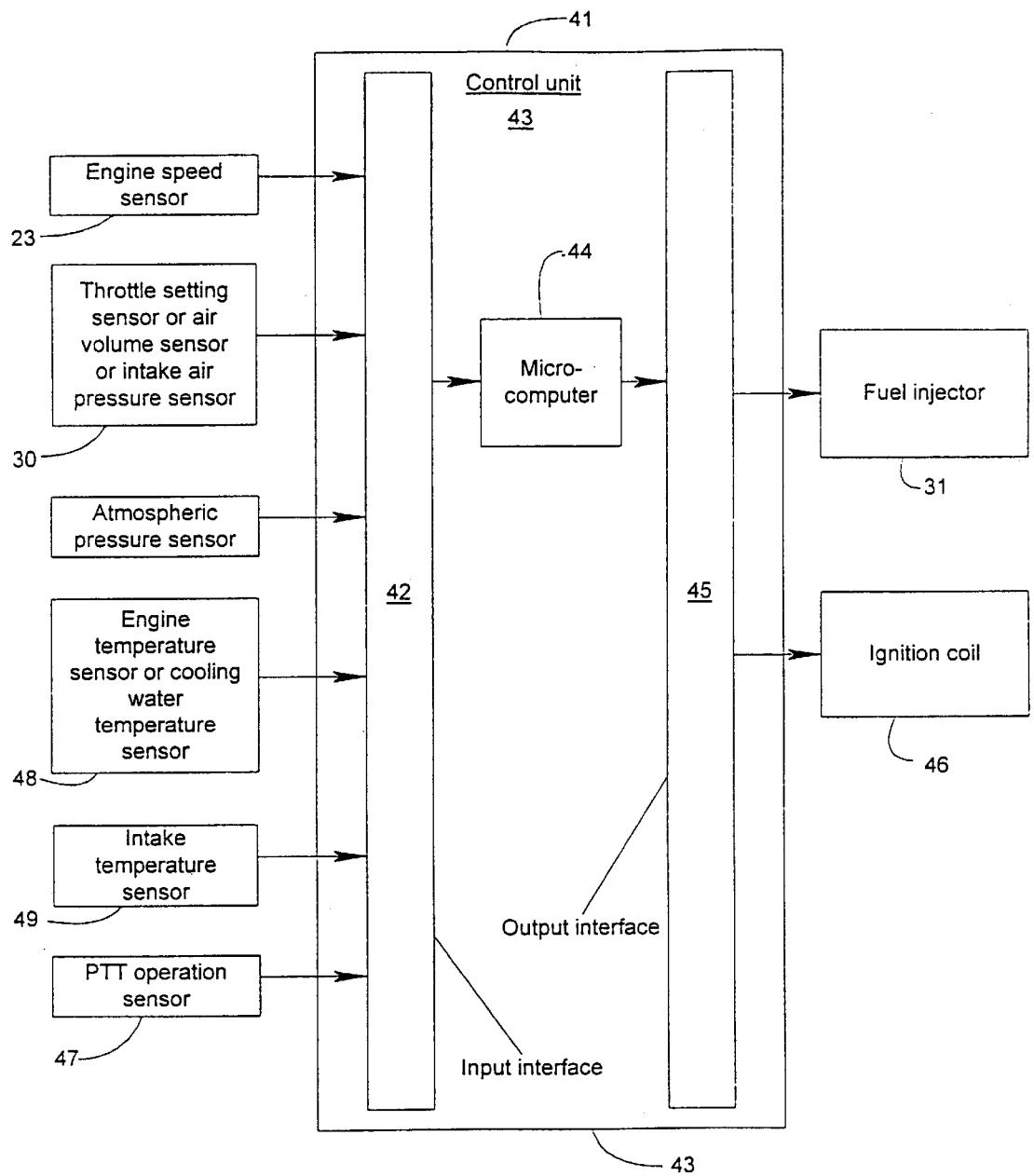
FIG. 4 is a block diagram of the fuel-injection control device.

The amount of injected fuel from fuel injector 31 is controlled by fuel injection control device 41. Referring to FIG. 4, fuel injection control device 41 detects the following with the corresponding sensors: rotation speed of engine 1, setting of throttle 28, suction pressure in surge tank 27, air volume, atmospheric pressure, engine temperature, cooling water temperature, temperature of intake air, and various conventional parameters. This data is passed to a control unit 43 via an input interface 42 to which signals are applied. A microcomputer 44 within control unit 43 calculates a suction volume based on the input data. After performing various corrections, the amount of fuel to be injected and the ignition timing is calculated. This is then output to fuel injector 31 and ignition coil 46 via an output interface 45.

Referring again to FIG. 1, outboard motor 2 can be pivoted up and down (trim and tilt) by the PTT. As trim applied to outboard motor 2 is changed, the load on engine 1 varies. This variation in the load can result in varying rotation speeds for the engine even if the throttle setting is fixed. In turn, this variation in rotation speed can change engine output. Thus, it is possible to use data from the PTT operation sensor 47 on the PTT in the calculations for the amount of fuel injection.

Figure 5:
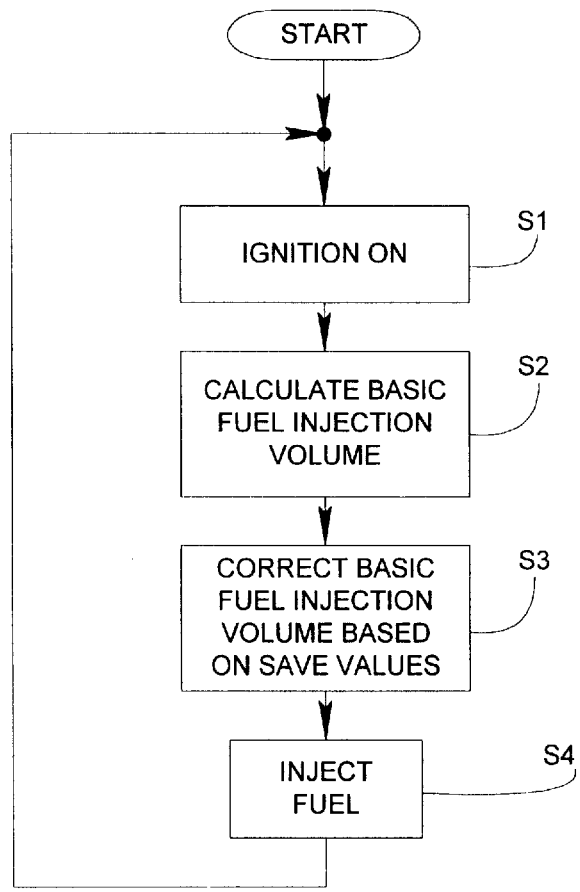
FIG. 5 is a flow chart of the main routine showing the flow of operations for fuel injection control.
Figure 6:
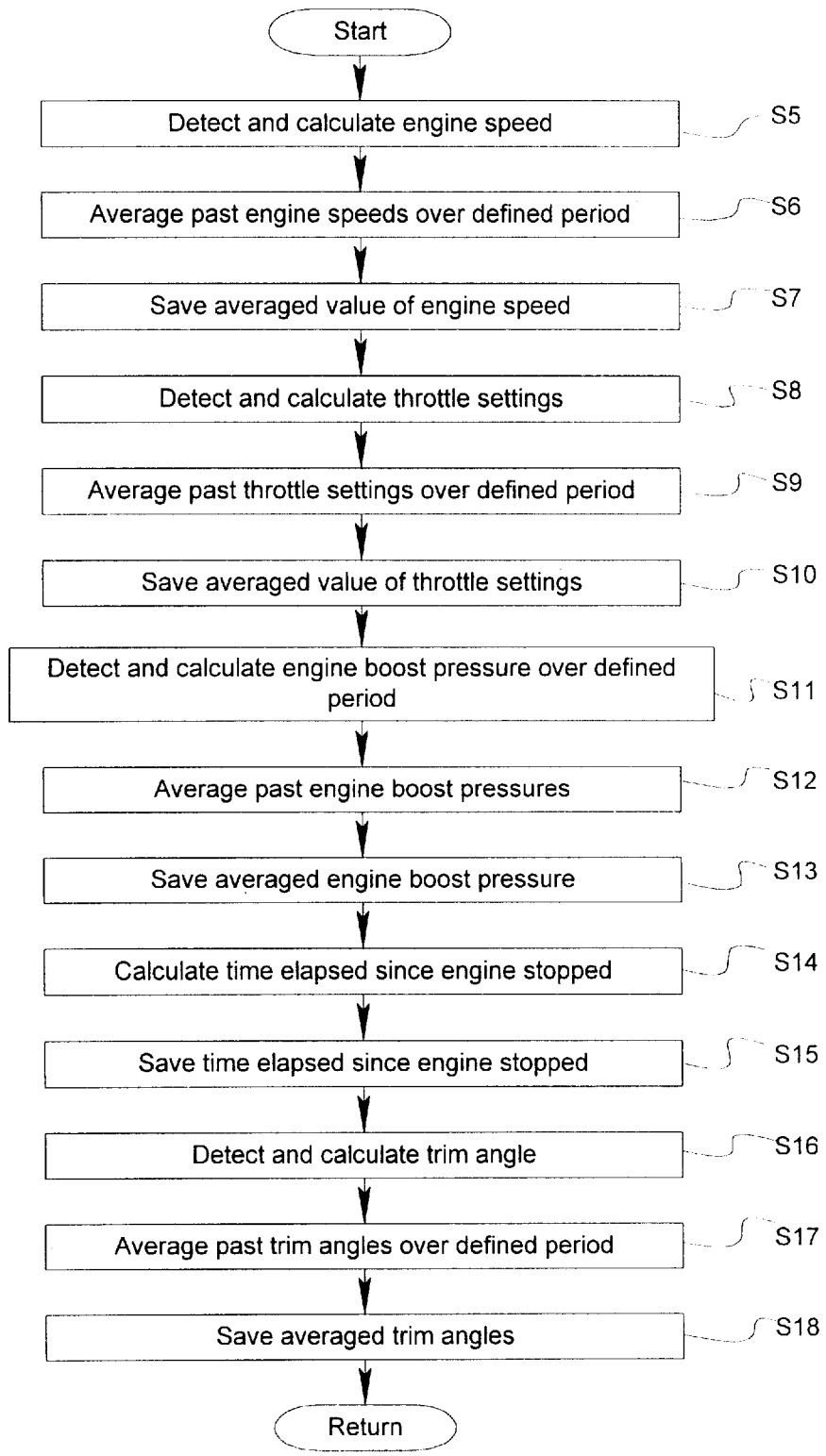
FIG. 6 is a flow chart of the save routine.
Figure 8A:
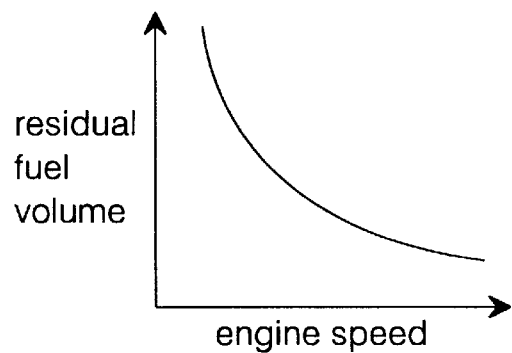
FIG. 8(a)–(e) are drawings showing the relationship between residual fuel volume and the conditions when the engine was stopped.
Figure 8B:
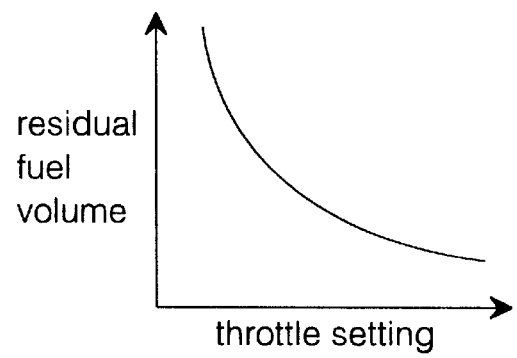
Figure 8C:
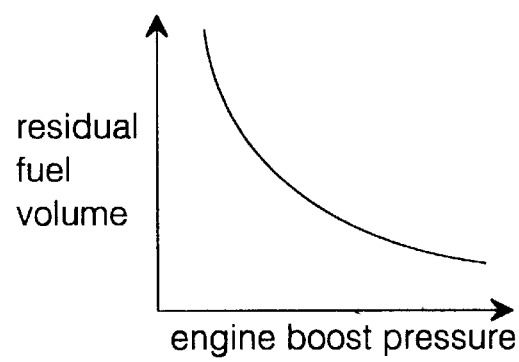
Figure 8D:
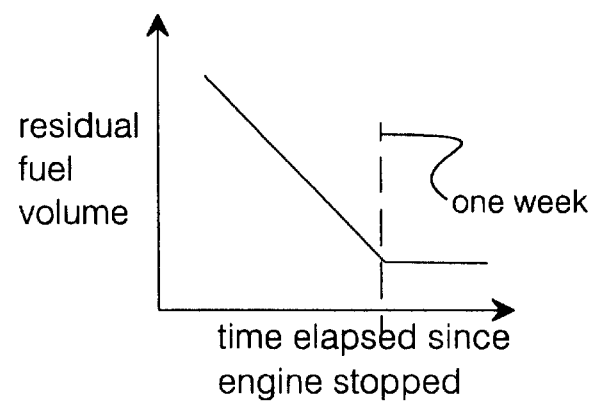
Figure 8E:
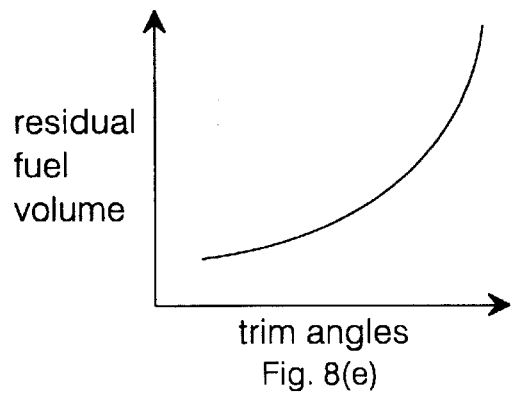

Referring to FIGS. 5 and 6, a main routine (FIG. 5) and a save routine (FIG. 6) are executed when an ignition (not shown in the drawing) is turned on to start engine 1 (S1). Microcomputer 44 uses the data described above to calculate an intake volume, and, after performing various corrections, calculates the basic fuel injection volume (S2). The basic fuel injection volume calculated is then corrected further based on the saved values obtained from the save routine described later (S3). Finally, the corrected fuel injection volume is injected into cylinder 18 of engine 1 (S4).

As indicated above, when engine 1 is stopped, there is some fuel that remains within engine 1, for example in crank chamber 10a and surge tank 27. Also, the volume of residual fuel varies according to the manner in which engine 1 was stopped and the time elapsed since engine 1 was stopped. For example, if the engine speed had been low before engine 1 was stopped, there is more residual fuel than if the engine speed had been high. Also, as for engine speed, a low setting for throttle 28 results in more residual fuel compared than for a high throttle setting. Furthermore, if the engine boost pressure had been low before engine 1 was stopped, there is more residual fuel than if the engine boost pressure had been high. Also, the longer the elapsed time since engine 1 was stopped, the less residual fuel there will be. Trim can be applied from shaft 5a of bracket 5 of outboard motor 2. The larger the trim angle is, the more residual fuel there will be.

Referring to FIG. 6, the speed of engine 1 is detected and calculated in step S5 as engine 1 operates. The past engine rotation speed values over a prescribed interval, e.g. ten seconds, are averaged in step S6. The average engine rotation speed (A) is saved in step S7.

Next, the setting of throttle 28 is detected and calculated in step S8. The past throttle setting values over a prescribed interval, e.g. ten seconds, are averaged in step S9. The average throttle setting value (B) is saved in step S10.

Next, the boost pressure of engine 1 is detected and calculated in step S11. The past engine boost pressure values over a prescribed interval, e.g. ten seconds, are averaged in step S12. The average engine boost pressure value (C) is saved in step S13.

When engine 1 is stopped, the time elapsed since the engine was stopped is detected and calculated in step S14. The elapsed time (D) is saved in step S15. Trim angle is detected and calculated in step S16. The past trim angle values over a prescribed interval, e.g. ten seconds, are averaged in step S17. The averaged trim angle value (E) is saved in step S18.

The saving of the various values described above is repeated continuously until engine 1 is stopped. When engine 1 is stopped, the average values are saved as the final data, and the elapsed time from the time engine 1 is stopped begins to accrue. When engine 1 is started again, saved values A through E, obtained from the save steps in the routine described above, are used as a basis for estimating the residual fuel volume in engine 1 after engine 1 was stopped. This estimated residual fuel volume is used as a basis for performing correction on the basic fuel injection volume.

Referring to FIGS. 7(A) through 7(E), sample correction maps for saved values A through E, obtained from the routine described above, are used to determine correction values. For example, one of correction values A1, A2, etc. would be chosen based on the corresponding average value (final data) for the engine rotation speed when engine 1 was stopped.

In these samples maps, the correction maps are two-dimensional maps, but it would also be possible to use three-dimensional maps where correction values are obtained from combinations of engine rotation speed and the throttle setting, for example.

As described above, when engine 1 is stopped, the operating conditions of engine 1 immediately before the engine is stopped are saved, such as engine rotation speed, throttle setting, engine boost pressure, and the like. These saved values are used as the basis for estimating the fuel volume that is expected to be left in engine 1 after engine 1 is stopped. This estimated residual fuel volume is used as a basis for correcting the basic fuel injection volume. This prevents fuel injection that is too concentrated or not concentrated enough when engine 1 is started, providing optimal air-to-fuel ratio and allowing engine 1 to start more efficiently.

Referring again to FIG. 4, there is no need for special detectors for fuel injection control device 41. The correction mechanism described above can be implemented using existing sensors by appropriately programming control microcomputer 44. Thus, there is little added cost. Also, since no changes in layout are needed for attaching new detecting means to engine 1, increases in costs are avoided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

In order to obtain the correction values described above, this embodiment used engine rotation speed, throttle setting, engine boost pressure, time elapsed since the engine stopped, and trim angle. However, it would also be possible to detect air intake volume, engine temperature, cooling water temperature and the like. Also, just using one source as a basis for obtaining the correction value can significantly improve efficiency in starting engine 1.

As described above, the present invention relates to a fuel-injection control device for outboard motors having a fuel-injection two-cycle engine. The rotation speed of the engine, the throttle setting, the boost pressure of the engine, and the like are detected and a basic fuel injection volume is determined. Fuel is sent to each of the cylinders. When the engine is stopped, the operating conditions of the engine immediately before the stopping of the engine are saved, and these saved values are used as a basis for estimating the residual fuel volume left in the engine after the engine was stopped. Based on this estimated value, the basic fuel injection volume is corrected. Thus, when the engine is started, an optimal air-to-fuel ratio is obtained, making the engine start more efficiently.

In outboard motors having a fuel-injection two-cycle engine, the rotation speed, throttle setting, engine boost pressure and the like are detected to determine the basic fuel injection volume. Fuel is sent to each of the cylinders. When the engine is stopped, the trim angle of the engine is saved, and this saved value is used as a basis for estimating the residual fuel volume left in the engine after the engine was stopped. Based on this estimated value, the basic fuel injection volume is corrected. Thus, when the engine is started, an optimal air-to-fuel ratio is obtained, and the engine starts more efficiently.

Furthermore, the time elapsed since the engine was stopped is detected and calculated, and this elapsed time is saved. This saved value is used as a basis for estimating the residual fuel volume left in the engine after the engine was stopped. Based on the estimated residual fuel volume, the basic fuel injection volume is corrected. Thus, a more optimal air-to-fuel ratio is provided during engine start-up.

Note that elapsed time after the engine is stopped can be determined in a number of ways. For example, a timer can be activated when the engine is stopped and the timer state at engine start-up (at the end of the engine shutdown interval) detected. Alternatively, a time can be read and stored in a memory and a new time, after the engine shutdown interval, read from the timer and subtracted from the time in the memory. In fact, the shutoff period could be detected and used to alter fuel flow by a pure analog device. Such alternatives are considered within the scope of at least some of the claims set forth below.

Note also that although according to the embodiments described above, the values used to correct the basic fuel volume are derived by averaging past detected values, alternatives are possible. For example, it is possible to calculate some other statistic from one or more past values such as a mode, a weighted average or any of a number of different statistics that would produce the advantages cited above. Such alternatives are considered within the scope of at least some of the claims set forth below.

Although in the embodiments described above, a corrected fuel injection volume is calculated from a basic fuel injection volume, it is clear that the process need not include separate steps of calculating a basic fuel injection volume and correcting that basic fuel injection volume. The final fuel injection volume can be derived directly from current and/or past stored values and/or elapsed time since engine shutoff. Such alternatives are considered within the scope of at least some of the claims set forth below.

Note that, whatever the statistic of the detected operating state of the motor is used to correct the fuel flow rate, it can be calculated by many different techniques. The instantaneous values can be stored in a memory and averaged after the engine is stopped. An analog or digital signal (the latter could be output by an A/D converter) could be convolved (or filtered some other way to produce a signal statistic), digitally or by an analog signal filter, as appropriate. There are many ways to produce the result of required by the invention, to use prior operating information about the outboard motor (including shutoff time) to determine the fuel flow at and during start-up. Such alternatives are considered within the scope of at least some of the claims set forth below.

What is claimed is:

1. A fuel injection control device for outboard motors with a fuel-injected engine, comprising:
    a control unit;
    a memory;
    a detector connected to detect an operating state of said outboard motor at, or prior to, a shutdown of said motor;
    said operating state is one of a throttle setting, a trim angle, and an engine boost pressure;
    said control unit being programmed to store in said memory information responsive to said operating state of said outboard motor; and
    said control unit being further programmed to control an initial flow of fuel to said engine, at a time of start up of said engine, responsively to said information stored in said memory.

2. A device as in claim 1, wherein said information stored in said memory is a statistic derived from sampled measurements of said operating state.

3. A device as in claim 1, wherein said operating state is one of an engine speed, a throttle setting, an engine boost pressure, and a time between a shutdown of said engine and a subsequent start-up time of said engine.

4. A device as in claim 1, wherein said operating state is one substantially affecting a residual fuel quantity left in a cylinder of said engine after said engine is shut down.

5. A device as in claim 4, wherein said engine is a two-cycle engine.

6. A device as in claim 4, wherein said information stored in said memory is a statistic derived from sampled measurements of said operating state.

7. A device as in claim 6, wherein said engine is a two-cycle engine.

8. A fuel injection control device for outboard motors with a fuel-injected engine, comprising:
    a control unit with a memory;
    a detector connected to detect an operating state of said outboard motor at, or prior to, a shutdown of said motor;
    said control unit being programmed to store in said memory information responsive to said operating state of said outboard motor;
    said control unit being further programmed to control an initial flow of fuel to said engine, at a time of start up of said engine, responsively to said information stored in said memory; and
    said information stored in said memory is an average of sampled measurements of said operating state.

9. A fuel injection control device for outboard motors with a fuel-injected engine, comprising:
    a control unit;
    a memory;
    a detector for detecting an operating state of said outboard motor at, or prior to, a shutdown of said motor;
    said control unit being programmed to store in said memory information responsive to said operating state of said outboard motor;
    said control unit being further programmed to control an initial flow of fuel to said engine, at a time of start up of said engine, responsively to said information stored in said memory;
    said information stored in said memory is an average of sampled measurements of said operating state; and
    said operating state is at least one of an engine speed, a throttle setting, and an engine boost pressure.

10. A method for controlling fuel flow rate to a fuel injector of an outboard motor having a two-cycle engine, comprising the steps of:
    measuring at least one of a throttle setting of said engine, a boost pressure of engine, and a trim angle of said outboard motor during a period of operation of said engine;
    saving, in a memory, a result of said step of measuring at a time immediately before said engine is stopped; and
    controlling an initial rate of fuel delivery to said engine, when said engine is started up again after said engine was stopped, responsively to said result of said step of measuring stored in said memory.

11. A method as in claim 10, wherein:
    said step of measuring includes generating a time-series of measurements of one of a speed of said engine, a throttle setting of said engine, a boost pressure of engine, and a trim angle of said outboard motor during said period of operation of said engine; and
    said step of saving includes calculating a statistic of said time-series.

12. A method for controlling fuel flow rate to a fuel injector of an outboard motor having a two-cycle engine, comprising the steps of:
    measuring at least one of a speed of said engine, a throttle setting of said engine, a boost pressure of engine, and a trim angle of said outboard motor during a period of operation of said engine;

said step of measuring includes generating a time-series of measurements of said one of a speed of said engine, a throttle setting of said engine, a boost pressure of engine, and a trim angle of said outboard motor during said period of operation of said engine;

saving, in a memory, a result of said step of measuring at a time immediately before said engine is stopped;

said step of saving includes calculating a statistic of said time-series;

said step of saving further includes calculating an average of said time-series; and controlling an initial rate of fuel delivery to said engine, when said engine is started up again after said engine was stopped, responsively to said result of said step of measuring stored in said memory.

13. A method for controlling fuel flow rate to a fuel injector of an outboard motor having a two-cycle engine, comprising the steps of:

measuring at least one of a speed of said engine, a throttle setting of said engine, a boost pressure of engine, and a trim angle of said outboard motor during a period of operation of said engine;

saving, in a memory, a result of said step of measuring at a time immediately before said engine is stopped;

said step of saving includes calculating a result of said step of measuring at a time immediately before said engine is stopped which is substantially representative of a fuel volume remaining in a cylinder of said engine when said engine is started up again; and controlling an initial rate of fuel delivery to said engine, when said engine is started up again after said engine was stopped, responsively to said result of said step of measuring stored in said memory.

14. A fuel injection control device for outboard motors with a fuel-injected engine comprising:

a main control unit;

at least one of a throttle setting detector, an engine boost pressure detector, and a trim angle of said outboard motor;

said main control unit being programmed to calculate a fuel injection volume from a current operating state of said engine;

said main control unit being further programmed to calculate, for injection at a time when said engine is started, a corrected fuel injection volume responsively to at least one of a stored past value of a throttle setting, a stored past value of an engine boost pressure, and a stored past value of said trim angle.

15. A device as in claim 14, wherein said main control unit is further programmed to control delivery of said corrected fuel injection volume to said fuel injected engine.

16. A device as in claim 14, wherein said corrected fuel injection volume is calculated to compensate for a residual quantity of fuel remaining in a cylinder of said engine at said time when said engine is started.

17. A fuel injection control device as in claim 14 where said main control unit is further programmed to calculate a corrected fuel injection volume responsive to a time elapsed since said engine was previously stopped.

18. A fuel injection control device for outboard motors with a fuel-injected engine comprising:

a main control unit;

at least two of an engine speed detector, a throttle setting detector, an engine boost pressure detector, a timer, and a trim angle of said outboard motor;

said main control unit being programmed to calculate a fuel injection volume from a current operating state of said engine; and said main control unit is further programmed to calculate, for injection at a time when said engine is started, a corrected fuel injection volume responsively to at least two of a stored past value of said engine speed, a stored past value of said engine boost pressure, a stored past value of said trim angle, and a time elapsed since said engine was previously stopped.

19. A fuel injection control device for outboard motors with a fuel-injected engine comprising:

means for controlling a fuel injector;

means for detecting at least one of a throttle setting, an engine boost pressure, and a trim angle of said outboard motor;

said means for detecting having means for applying an output signal to said means for controlling, said output signal being responsive to a detecting of said means for detecting;

said means for controlling further including means for storing information derived from said output signal;

said main control unit further including means for calculating, for injection at a time when said engine is started, a corrected fuel injection volume; and said corrected fuel volume being calculated responsively to said information derived from said output signal.

20. A device as in claim 19, wherein said corrected fuel volume is calculated from said information and a measured current operating condition of said engine.

21. A device as in claim 20, wherein said information reflects a residual fuel volume remaining in said engine at said time when said engine is started.

22. A device as in claim 19, wherein said information reflects a residual fuel volume remaining in said engine at said time when said engine is started.

23. A fuel injection control device as in claim 19 wherein said means for detecting further includes means responsive to a time interval between a shutdown of a said engine and a start-up following said shutdown.

24. A control system for a fuel-driven motor, comprising:

a fuel delivery system connected to said fuel-driven motor to supply fuel thereto at a variable rate;

a controller connected to control said variable rate of said fuel delivery system;

a first sensor to sense a current operating condition of said motor, said sensor being connected to apply an output reflecting said current operating condition of said motor to said controller;

said current operating condition is one of a trim angle, a throttle setting, and an engine boost pressure;

a memory connected to said first sensor;

said controller being programmed to store a result of a measurement, by said sensor, in said memory when said engine is running and retain said result in said memory after a shutting down of said engine; and said controller being further programmed to read said memory and control said variable rate of said fuel delivery system responsively to said result stored in said memory when said engine is started up following said shutting down.

25. A device as in claim 24, wherein said current operating condition is a parameter that substantially affects a residual fuel volume remaining in said engine after said shutting down.

26. A device as in claim 25, wherein said current operating condition is a parameter that substantially affects an optimal fuel requirement of said engine during steady operation.

27. A method of controlling fuel delivery to an engine motor, comprising the steps of:

sensing a current operating condition of said engine while said engine is running;

said step of sensing a current operating condition includes sensing at least one of a trim angle, a throttle setting, and an engine boost pressure;

adjusting a rate of fuel delivery to said engine responsively to a result of said step of sensing;

storing, in a memory, a result of said step of sensing;

retaining said result stored in said memory after said a halting of said engine;

retrieving said result stored in said memory at a starting of said engine, said starting occurring after said halting; and determining, responsively to said result retrieved from said memory, an initial rate of fuel delivery to said engine to occur during said starting.

28. A method as in claim 27, wherein said step of sensing a current operating condition of said engine includes sensing an operating condition that substantially affects steady state optimal fuel delivery requirement and a volume of residual fuel remaining in said engine when said engine is shut down.

29. A fuel injection control device for controlling fuel injection during a start up of an engine comprising:

estimating means for making an estimation of a residual fuel amount of said engine;

said estimating means making said estimation based upon previous values of at least one of a throttle setting, an engine boost pressure, and a trim angle;

said previous values occurring during a prior use of said engine; and injecting means for injecting fuel into said engine based upon said estimation made by said estimating means.

30. A fuel injection control device as in claim 29 further comprising:

detecting means for detecting a present state of said engine based upon at least one of engine speed, throttle setting, and engine boost pressure; and said injecting means injects fuel based on said present state adjusted by said estimation.

31. A method for controlling the injection of fuel into an engine during a start up of said engine comprising:

storing at least one of throttle setting, engine boost pressure, and trim angle to produce a stored value;

said storing occurring during an operation of said engine prior to said injecting;

estimating a residual fuel volume based on said stored value; and injecting fuel based on said residual fuel volume.

32. A method as in claim 31 further comprising the steps of:

determining a present state of said engine based upon at least one of engine speed, throttle setting, and boost pressure; and injecting fuel based upon said present state altered by said residual fuel volume.

* * * * *